United States Patent [19]

Cohn

[11] 4,003,780

[45] Jan. 18, 1977

[54] TAPE DISPENSING APPARATUS

[75] Inventor: Robert Cohn, Millbrae, Calif.

[73] Assignee: Champion International Corporation, Stamford, Conn.

[22] Filed: Mar. 26, 1976

[21] Appl. No.: 670,835

[52] U.S. Cl. .............................. 156/519; 156/355; 156/521

[51] Int. Cl.² .............................. B32B 31/00

[58] Field of Search .................. 156/361, 355, 363; 186/519–521

[56] References Cited

UNITED STATES PATENTS

| | | | |
|---|---|---|---|
| 2,507,683 | 5/1950 | Smith | 156/519 |
| 2,990,081 | 6/1961 | DeNevi et al. | 156/519 |
| 3,436,294 | 4/1969 | Marano | 156/361 X |
| 3,954,543 | 5/1976 | Messmer | 156/363 |
| 3,957,570 | 5/1976 | Helm | 156/519 |

*Primary Examiner*—David A. Simmons
*Attorney, Agent, or Firm*—Evelyn M. Sommer

[57] ABSTRACT

Apparatus for feeding and applying a length of an adhesive tape to a reusable envelope closure. Tape is fed from a supply roll by a draw roll which is in contact with the adhesive surface of the tape to frictionally advance the tape between a stationary knife blade and a rotary knife blade. The tape is cut to a desired length by the cooperating edges of the knife blades and delivered to a vacuum roll which transports the cut length of tape to the envelope and presses it onto the envelope to form a part of the reusable closure. A cooperating convex and concave roller forms the tape into a V prior to it being cut to rigidify it as it is cut. Means are also provided to vary the length of tape which is cut and to stop operation of the apparatus upon sensing the absence of an envelope beneath the apparatus.

3 Claims, 4 Drawing Figures

TAPE DISPENSING APPARATUS

BACKGROUND OF THE INVENTION

1. Field of the Invention:

This invention relates to an apparatus for applying a length of tape to a reusable envelope closure. More particularly, the envelope has a closure flap provided with a piece of tape dispensed by the apparatus of the present invention capable of adhering a plurality of times to the main body of the envelope without losing its effectiveness.

2. Description of the Prior Art:

Canadian Pat. No. 745,888, issued Nov. 8, 1966, discloses a reusable envelope in which a flap of the envelope is adhered to the main body. An aperture is punched in the flap and covered by an adhesive material, such as the well known adhesive tape marketed under the trademark SCOTCH TAPE. A second tape is fixed on the main body of the envelope which has a glossy surface. The position of this tape is beneath the closure flap of the envelope when the closure flap is in its closed position. When the tacky surface of the adhesive tape comes in contact with the glossy surface of the tape on the main body, a good reliable bond is formed to seal the envelope. However, the tacky surface of the adhesive tape and closure flap may be pulled away from the glossy surface of the tape on the main body to break the bond and the glossy surface retains very little or no tacky material from the adhesive tape. Therefore, the closure may be resealed a number of times.

U.S. Pat. No. 3,906,844, issued Sept. 23, 1975, discloses an apparatus for producing the envelope closure illustrated in Canadian Pat. No. 745,888. The envelopes having already been formed without the reusable closure, are fed in spaced relation along a conveyor. The apparatus includes means operative to open the closure flap of each envelope as the envelope is being moved along the conveyor, means to cut an opening in the flap, a first tape dispensing means for fixing on the main body of the envelope a band of material having a glossy surface, the band of material being disposed in a position corresponding to the closure flap opening when it is sealed to the main body, and a second tape dispensing means for applying and fixing an adhesive tape on the flap over the opening to form the reusable closure seal for the envelope.

The same tape dispensing apparatus in U.S. Pat. No. 3,906,844 is used to apply both the adhesive tape and glossy band to the envelope. The apparatus includes a tape supply roll from which the tape is fed to a rotatable applicator wheel, while suitable tension is maintained on the tape. A rotatable knife whose axis is in the same horizontal plane as the axis of the applicator wheel is provided so as to rotate in a direction opposite to the applicator wheel. The knife has an edge which is capable of engaging the applicator wheel to transversely cut the continuous band of tape. After a desired length of tape is cut, a suction device retains the length of tape against the outer periphery of the applicator wheel until the tape meets the main body of the envelope or the closure flap having the opening, as the case may be, to apply the tape to the envelope. The tape must be capable of sliding relative to the circumference of the applicator wheel in order to assure delivery of a length of tape which is suitable to overlap the opening cut in the flap, or alternatively, of a length to traverse the main body of the envelope and no more. A feed control to accomplish this is not disclosed.

SUMMARY OF THE INVENTION

In contrast to the tape dispensing apparatus disclosed in U.S. Pat. No. 3,906,844, the tape dispensing apparatus of the present invention provides an entirely different feed mechanism for the tape from a supply roll to the envelope. A draw roll in contact with the sticky side of the tape draws the tape by friction from the supply roll. A rotary knife cuts the tape to the precise desired length by cutting against a stationary knife. Movement of the draw roll is synchronized by a gear train with rotation of the rotary knife so that the length of tape desired is accurately cut. The length of tape cut may be changed by simply changing the gear ratio between the draw roll and the rotary knife.

Just before the tape is cut, the tape is fed from the draw roll between a convex and concave roller which forms the tape into a V-shape to give it more rigidity during the feeding process to the knife to assure complete accuracy in the length of tape cut. The rotary knife flattens the tape again just before it is cut. The precisely cut length of tape is then fed to a vacuum roll which applies it to the envelope closure flap or envelope main body, as the case may be.

The tape dispensing apparatus of the present invention also includes sensing means to detect the absence of an envelope on a conveyor beneath the vacuum applicator roll. When this condition is sensed, an electric clutch and brake are activated to stop the draw roll from drawing tape from the supply until envelopes on the conveyor once again pass beneath the tape dispensing apparatus. In this manner, no tape is wasted during the application process.

BRIEF DESCRIPTION OF THE DRAWINGS

Further objects and advantages of the present invention will become more apparent from the following description and claims, and from the accompanying drawings, wherein:

DETAILED DESCRIPTION OF THE PREFERRED EMBODIMENT

Figure 1:
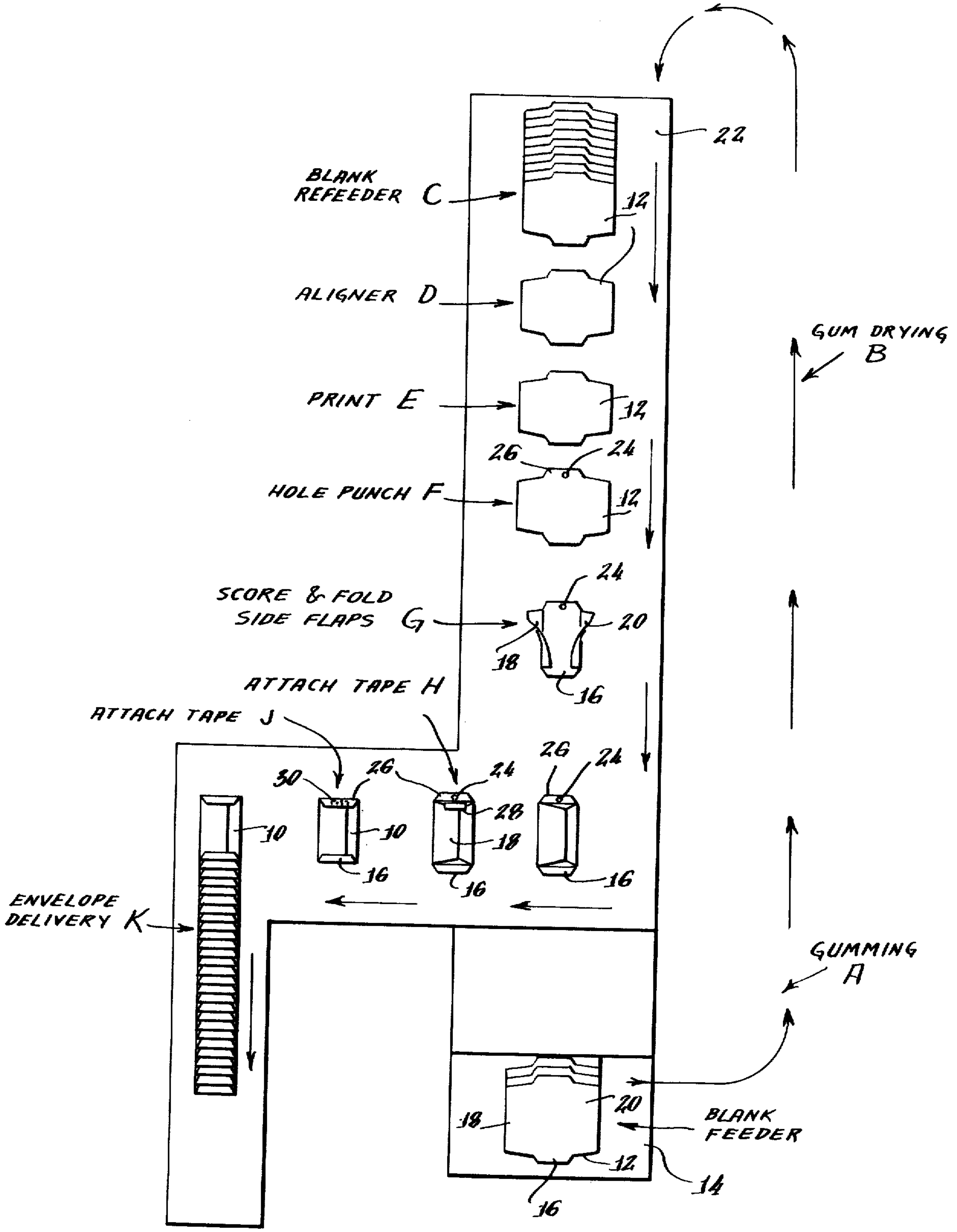
FIG. 1 is a schematic diagram illustrating the sequence of operations of forming a reusable envelope, in which process, the tape dispensing apparatus of the present invention is employed.

Referring now to the drawings in detail, wherein like numerals indicate like elements throughout several views, FIG. 1 schematically illustrates a sequence of operations for forming an envelope 10 provided with a reusable tape closure. Rather than the envelopes being preformed, as in the prior art, the process illustrated forms the envelope from a blank 12.

Envelope blanks 12 are fed by a feeding apparatus 14 to a gumming station A wherein selected portions of the seal flap are gummed if desired and dried at station B. The blanks 12 are then collected and refed at station C onto a moving, endless conveyor belt 22.

Blanks 12 are then aligned at station D on belt 22 and fed to a printing station E where suitable indicia may be printed on the blank, as desired. A hole 24 is then punched in the top closure flap 26 of blank 12 at station F. Opposed side flaps 18 and 20 of blank 12 are then scored and folded over one another at station G, the gummed portion of side flap 20 underlying side flap 18 and adhesively connected thereto. Each blank 12 is then fed beneath the tape dispensing apparatus 50 of the present invention at station H wherein a band of adhesive 28 having a glossy upper surface is attached to the main body of the folded blank 12. Closure flap 26 is then closed and a second piece of adhesive tape 30 having a downwardly facing tacky surface is applied by a second tape dispensing apparatus 50 over opening 24 in the closure flap 26 to adhesively connect flap 26 to the main body of the finished envelope 10 by creating a seal between tapes 30 and 28 through opening 24. Simultaneously, bottom flap 16 is folded over side flaps 18 and 20 and adhesively connected thereto to complete reusable envelope 10. The envelopes 10 are then collected at station K and stacked for delivery.

Figure 3:
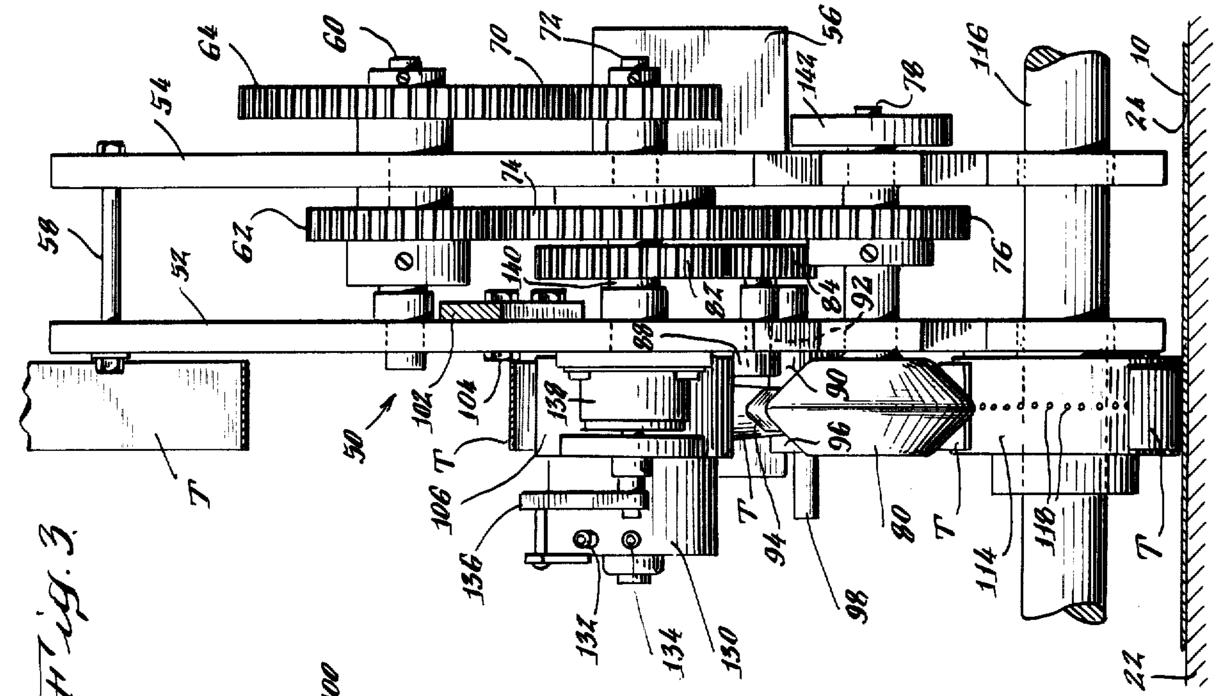
FIG. 3 is a cross sectional view taken substantially along the plane indicated by line 3—3 of FIG. 2.
Figure 2:
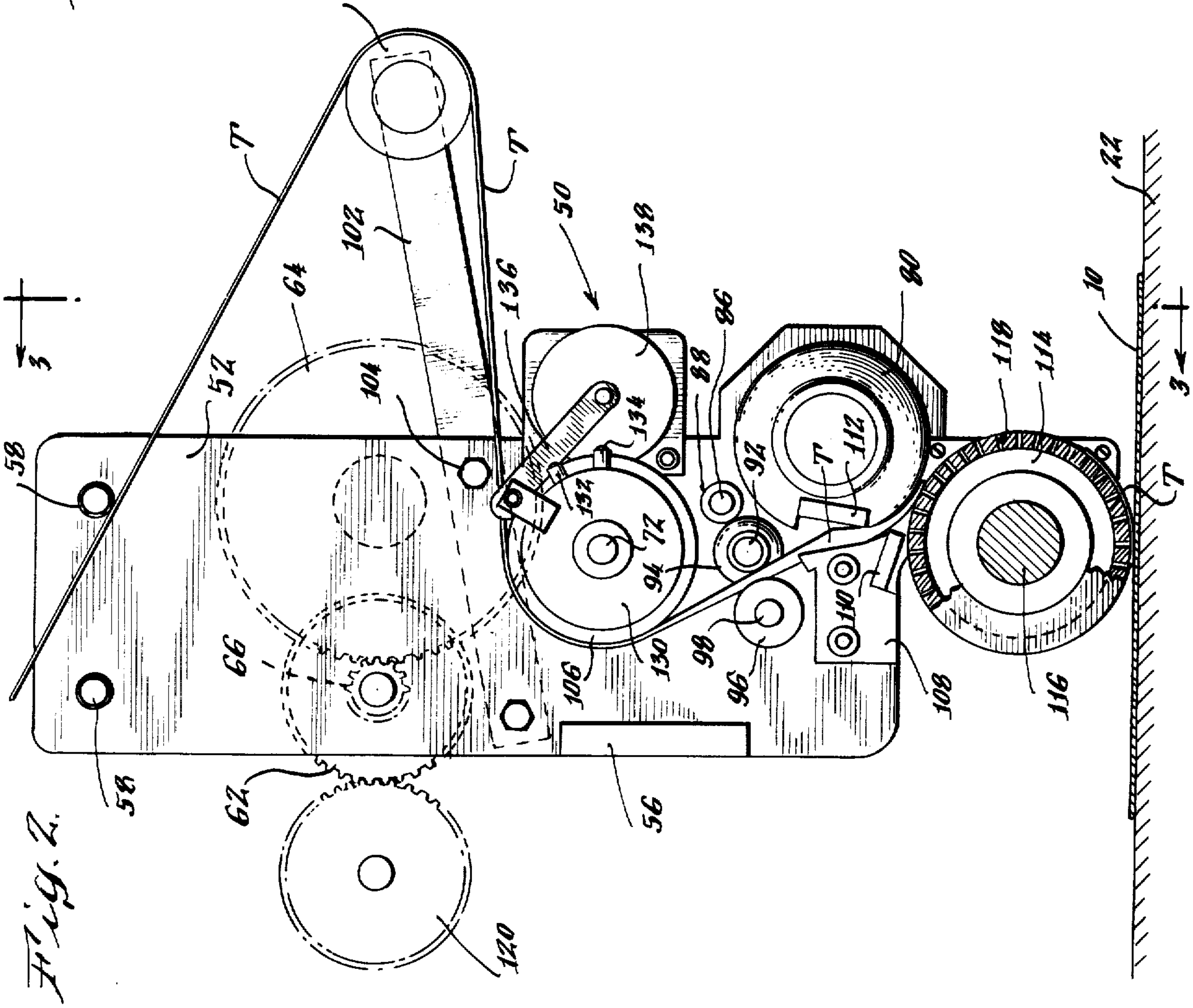
FIG. 2 is a side view in elevation of the tape dispensing apparatus of the present invention employed in the process illustrated in FIG. 1.
Figure 4:
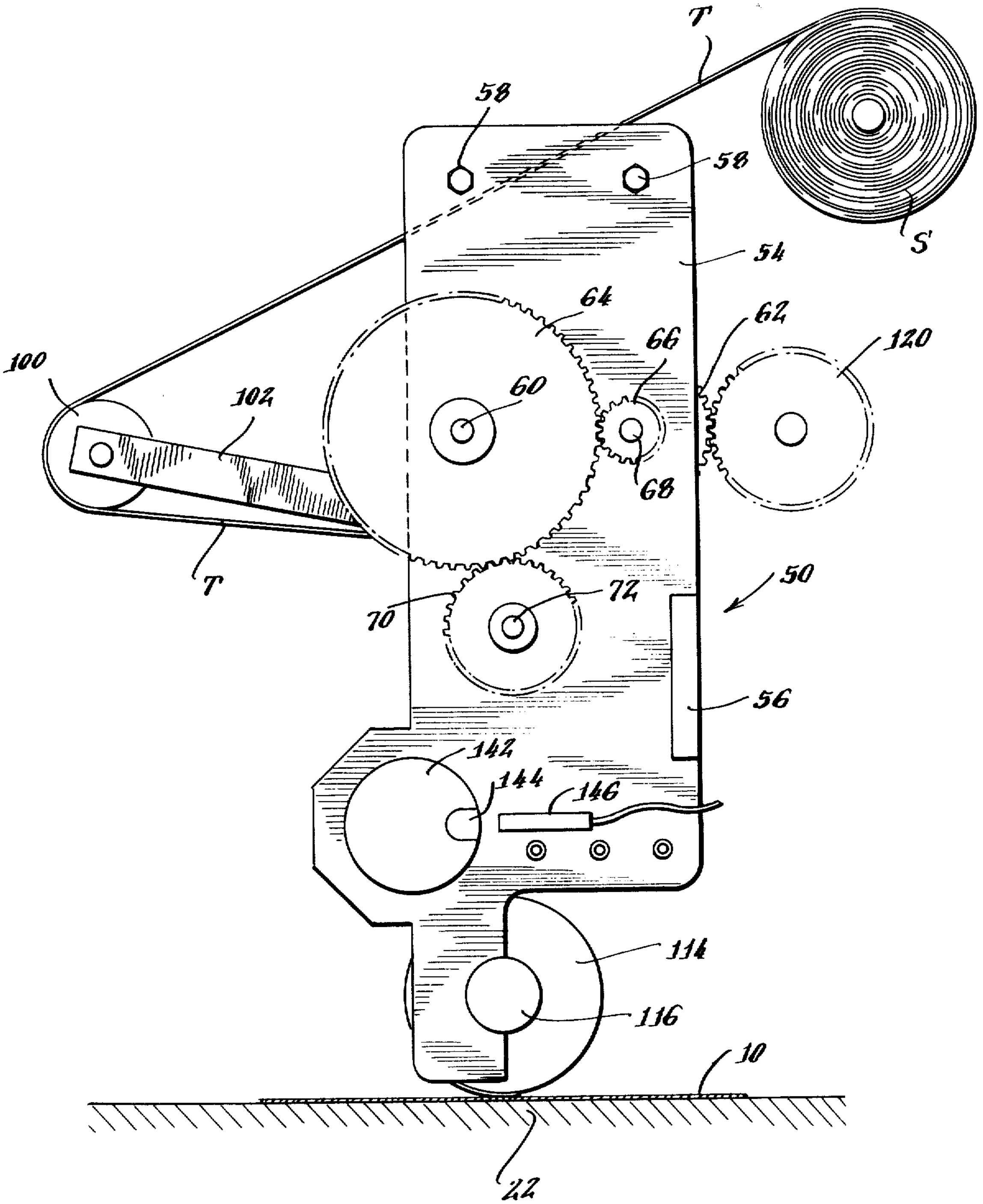
FIG. 4 is a side view in elevation of tape dispensing apparatus of the present invention as seen from the right-hand side of FIG. 3.

The tape dispensing apparatus 50 of the present invention, used at stations H and J, is illustrated in detail in FIGS. 2 to 4, inclusive.

Tape dispensing apparatus 50 includes a pair of vertical, substantially planar side frames 52 and 54 mounted by a horizontal plate 56 on the frame of the envelope forming machine above conveyor 22 at stations H and J. Mounting plate 56 is attached by any suitable means to the frame of the envelope forming machine. The side frames 52 and 54 are connected together at their top by suitable bolts 58.

Mounted between side frames 52 and 54, in suitable bearings, is a rotatable shaft 68 which has a tape drive gear 62 fixed thereto along with a draw roll drive gear 66. Gear 66 is in meshing engagement with an idler gear 64 mounted on a shaft 60 rotatably mounted on side frame 54. Idler gear 64 is also in meshing engagement with a draw roll feed length change gear 70 fixed to a shaft 72 rotatably mounted between side frames 52 and 54. Tape drive gear 62 is in meshing engagement with an idler gear 74 mounted on a shaft 140 rotatably supported between side frames 52 and 54. Idler gear 74 is in meshing engagement with a gear 76 fixed to a shaft 78 extending between side frames 52 and 54 and mounted in suitable bearings. Gear 76 is used to rotate a convex rotary knife holder 80 mounted on one end of shaft 78.

Also mounted on shaft 140 is a gear 82 in meshing engagement with a gear 84 mounted on one end of a shaft 86, which is retained by collar 88. Through suitable gearing gear 84 rotates shafts 92 and 98. The outer end of shaft 92 carries a convex roller 94. A concave roller 96 mounted on a shaft 98 rotatably mounted on side frame 52 is positioned near the outer diameter of convex roll 94.

Tape T is fed from a tape supply roll S. The tape T is fed around the circumference of an idler pulley 100 with the sticky adhesive side out, mounted on the end of an idler arm 102 fixed by bolts 104 to the side frame 52 of the tape dispensing apparatus 50. Idler pulley 100 reverses the tape so that its sticky side is facing downwardly as it passes about the idler pulley 100. The sticky side of the tape T comes in contact with the outer circumference of a draw roll 106, which feeds the tape T between the convex roller 94 and concave roller 96 which forms the tape into a V-shape to rigidify it for handling and cutting purposes.

Mounted on side frame 52 of tape dispenser 50 is a stationary knife holder 108 mounting a stationary knife blade 110 which has a slight shear angle on its outer free edge. Rotary knife holder 80 includes a rotary knife blade 112. Tape T is fed between the stationary knife blade 110 and the rotary knife blade 112 and is cut to a desired length by the edge of the rotating knife blade pushing the tape T against the shear edge of stationary knife blade 110. Rotary knife blade 112, having a planar surface contacting tape T just before it is cut, flattens the end of tape T. Once it is cut, the cut length of tape T is drawn onto a vacuum roll 114 mounted on a shaft 116. Vacuum roll 114 is hollow and is connected to a suitable plenum for inducing suction in the interior of the roll. The outer circumference of the roll includes holes 118 therethrough, which enables the vacuum induced in the roll to be present at the outer circumference of the roll 114.

Vacuum roll 114 picks up the cut length of tape T on its non-sticky side and reverses it while rotatably advancing the cut length of tape into contact with the main body of the envelope 10 on conveyor 22 at station H, or over the opening 24 in the closure flap 26 at station J. The flattened end of tape T enables it to be retained by the vacuum on roll 118, and the roll flattens the remainder of the tape T as it applies it to envelope 10.

The tape T is dispensed by placing tape drive gear 62 in meshing engagement with a gear 120 connected to the drive of the envelope forming machine. Gear 120 rotates gear 62, which in turn will rotate shaft 68 to turn gear 66. Gear 66 is in meshing engagement with idler gear 64. Therefore, rotation of gear 66 will cause rotation of gear 64 which will in turn through its meshing engagement with the draw roll feed length change gear 70, attached to shaft 72, cause shaft 72 to rotate. Draw roll 106, which is fixed to shaft 72, will turn, pulling tape T from roll S by friction and feeding the tape T threaded around its circumference, between concave and convex rolls 96 and 94, respectively.

Draw roll 106 pushes tape T between rollers 96 and 94, which bend and rigidify the tape, to the cutting blades 110 and 112. Rotation of shaft 140 by gear 74 in meshing engagement with gear 62, will also cause gear 82 to rotate. Gear 82 is in meshing engagement with gear 84, mounted on shaft 86 retained by collar 88. Suitable gears on shaft 92 and 91 rotate rollers 94 and 96 at a surface speed slightly greater than roll 106 causing tape T to be drawn off of roll 106. Roll 96 can be adjusted to roll 94 to change tension on tape T between rolls 94, 96 and roll 106. Rolls 94 and 96 feed tape to the stationary knife blade 110 and rotary knife blade 112.

Tape drive gear 62 also being in meshing engagement with idler gear 74, can drive rotary knife gear 76 to cause rotary knife holder 80 to rotate on shaft 78 to rotate rotary knife blade 112 to cut the tape T against the edge of stationary knife blade 110 as the tape T is fed by draw roll 106 between concave and convex rollers 96 and 94. Since rotary knife holder 80 is convex, tape T can be fed more rapidly around the holder 80.

By changing the ratio between idler gear 64 and draw roll feed length change gear 70, different lengths of tape can be cut by rotary knife blade 112 relative to stationary knife blade 110, at will. By changing the gear arrangement, the speed of rotation of draw roll 106 on shaft 72 can be varied relative to the speed of rotation of shaft 78 mounting rotary knife holder 80, since the driving gear ratio between idler gear 74 and rotary knife rotation gear 76 remains constant. Similarly, the meshing gears 82 and 84 drives rollers 96 and 94, will also retain the rollers 96 and 94 at their original speed relative to rotation of draw roll 106 so that only the rate of rotation of draw roll shaft 72 can vary the length of tape T fed to the cutting blades during one revolution of holder 80. Therefore, depending on the ratio between gears 64 and 70, the length of tape T which is cut can be varied.

Provision is also made for sensing the absence of an envelope 10 on conveyor 22 to stop the feeding of tape T thereby preserving tape and precluding the tape from being applied to conveyor 22.

This is accomplished by mounting an electric clutch 130 on the end of shaft 72, and an electric brake 138.

Torque is transmitted to roll 106 from shaft 72 when electric power is applied to terminals 132 and 134 activating electric clutch 130. Roll number 106 is stopped by removing electric power from clutch 130 and applying electric power to brake 138. The braking torque is transmitted through gear 150 on the outside of brake to gear 151 on the outside of roll 106.

Switching the electric power from clutch 130 to brake 138 and return is accomplished by a specially designed electronic system consisting of an envelope sensor mounted on the conveyor upstream from the tape applicator, a synchronizing sensor 146, a control latch and relay, control amplifier and power supply for the system.

The synchronizing sensor is normally the sensing roll 142. When the envelope sensor senses an envelope at the same time the synchronizing sensor detects the synchronizing notch 144, the control latches and sends electric power to clutch 130 locking shaft 72 to roll 106 and remains latched until such time that the envelope sensor does not detect an envelope at the same time the synchronizing sensor detects synchronizing notch 144. The control then switches the power from the clutch to the brake stopping roll 106. The control stays in this mode until synchronizing of the two sensors is resumed.

What is claimed is:

1. Tape dispensing apparatus comprising:

means for continuously feeding a substantially planar tape having an adhesive surface from a supply roll, means for cutting said piece of tape into discrete lengths as said tape is continuously fed by said feeding means, said tape feeding means including a draw roll engaging the adhesive surface of said tape for frictionally advancing said tape from said supply roll to said cutting means, means between said tape feeding means and cutting means for rigidifying said tape as it is being fed continuously just prior to it being cut, said means for rigidifying said tape including a cooperating concave and convex roller for forming said tape into a V as it is fed by said tape feeding means to said cutting means, said cutting means including a stationary knife blade having a shear edge, and a rotary knife blade having a planar surface in contact with the tape just prior to its being cut to flatten the tape and push it against the shear edge of said stationary knife blade to cut said tape, said rotary knife blade being mounted on a rotary knife holder having a convex circumference in contact with the adhesive surface of the tape to feed the tape rapidly about the knife holder, and means for transporting said cut length of tape and applying it to a sheet of material, said tape transporting means including a vacuum roll connected to a source of negative pressure for receiving tape with its adhesive side out from the convex circumference of said rotary knife holder and pressing said tape on said sheet of material.

2. Tape dispensing apparatus in accordance with claim 1 including:

means for sensing the absence of a sheet of material beneath said tape dispensing apparatus, and means responsive to sensing the absence of said sheet of material to stop said tape feeding means, and for restarting said tape feeding means when presence of sheet material is again sensed.

3. Tape dispensing apparatus in accordance with claim 2 wherein said means for stopping the operation of said tape feeding means includes an electric clutch and brake.

* * * * *

PO-1050
(5/69)

UNITED STATES PATENT OFFICE
CERTIFICATE OF CORRECTION

Patent No. 4,003,780 Dated January 18, 1977

Inventor(s) Robert Cohn

It is certified that error appears in the above-identified patent and that said Letters Patent are hereby corrected as shown below:

In column 1, line 29, after "surface" insert --of the tape on the main body to break the bond and the glossy surface--.

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*